(12) United States Patent
Miyakawa et al.

(10) Patent No.: US 9,921,456 B2
(45) Date of Patent: Mar. 20, 2018

(54) ILLUMINATION APPARATUS

(71) Applicant: CANON KABUSHIKI KAISHA, Tokyo (JP)

(72) Inventors: Toshiki Miyakawa, Yokohama (JP); Yoshiharu Tenmyo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 401 days.

(21) Appl. No.: 14/616,497

(22) Filed: Feb. 6, 2015

(65) Prior Publication Data
US 2015/0227026 A1 Aug. 13, 2015

(30) Foreign Application Priority Data

Feb. 10, 2014 (JP) ................................. 2014-023827

(51) Int. Cl.
*G03B 15/02* (2006.01)
*G03B 15/05* (2006.01)

(52) U.S. Cl.
CPC ...... *G03B 15/05* (2013.01); *G03B 2215/0539* (2013.01); *G03B 2215/0582* (2013.01); *G03B 2215/0589* (2013.01)

(58) Field of Classification Search
CPC .... G03B 2215/0582; G03B 2215/0589; G03B 2215/0539; G02B 6/0031; G02B 5/045; G02B 6/002; G02B 6/0046; H04N 5/2256
USPC ................................. 362/235, 16; 396/198
See application file for complete search history.

(56) References Cited

U.S. PATENT DOCUMENTS

| 5,671,994 | A  | * | 9/1997  | Tai ............................ F21V 5/02 362/23.15 |
| 5,897,210 | A  |   | 4/1999  | Simon |
| 6,256,447 | B1 | * | 7/2001  | Laine .................. G02B 6/0038 349/56 |
| 7,712,906 | B1 | * | 5/2010  | Larimer ............... G02B 6/0008 362/11 |
| 7,712,907 | B2 | * | 5/2010  | Zyka ...................... G02B 5/045 362/16 |
| 2005/0231948 | A1 | * | 10/2005 | Pohlert ................... F21V 14/06 362/237 |

(Continued)

FOREIGN PATENT DOCUMENTS

| CN | 100412680 C | 8/2008 |
| CN | 201269491 Y | 7/2009 |

(Continued)

*Primary Examiner* — Claude J Brown
(74) *Attorney, Agent, or Firm* — Canon U.S.A., Inc. IP Division

(57) ABSTRACT

An illumination apparatus includes a light source, a light-receiving unit, and a light guide unit formed in an arc shape. The light guide unit includes a light incidence section on which light from the light source is incident. The light incidence section is disposed on an outer circumferential side of the light guide unit, and faces the light source. The light guide unit further includes a first reflecting section having a first and a second region, and a second reflecting section having first and second surfaces. The first surface reflects the light incident from the light incidence section toward the first region, and the second surface reflects the light incident from the light incidence section toward the second region. The light-receiving unit is disposed at a position between the first and the second surfaces.

18 Claims, 10 Drawing Sheets

(56) References Cited

U.S. PATENT DOCUMENTS

| | | | |
|---|---|---|---|
| 2006/0039692 A1* | 2/2006 | Lee | G02B 6/0038 396/198 |
| 2006/0093344 A1* | 5/2006 | Neel | G03B 15/05 396/176 |
| 2006/0209417 A1* | 9/2006 | Kojima | G02B 6/0018 359/618 |
| 2007/0147041 A1* | 6/2007 | Shiratsuchi | F21V 5/007 362/268 |
| 2008/0284921 A1* | 11/2008 | Hirata | G02B 27/2278 348/756 |
| 2010/0315816 A1 | 12/2010 | Madelin | |
| 2013/0009180 A1* | 1/2013 | Kim | G02B 6/0026 257/89 |
| 2015/0084080 A1* | 3/2015 | Kawakita | H01L 25/167 257/98 |

FOREIGN PATENT DOCUMENTS

| | | |
|---|---|---|
| CN | 100539627 C | 9/2009 |
| CN | 101672444 A | 3/2010 |
| CN | 204515314 U | 7/2015 |
| JP | S54-137327 A | 10/1979 |
| JP | S60-249124 A | 12/1985 |
| JP | H10-274799 A | 10/1998 |
| JP | 2001-215574 A | 8/2001 |
| JP | 2001-255574 A | 9/2001 |
| WO | 2004/081648 A2 | 9/2004 |

* cited by examiner

SEC A-A

SEC-B-B

DETAIL C

SEC E-E

DETAIL F

DETAIL G

ILLUMINATION APPARATUS

BACKGROUND OF THE INVENTION

Field of the Invention

The present invention relates to an illumination apparatus.

Description of the Related Art

In macro photographing for capturing an image of a subject at near distance, an illumination apparatus having a circumferentially ring-shaped or arc-shaped light-emitting section at the end of an imaging lens is often used. Japanese Patent Application Laid-Open No. 2001-215574 discusses an illumination apparatus having a ring-shaped light-emitting unit including a plurality of arc-shaped light sources, such as xenon tubes, arranged along the circumference of an imaging lens.

However, the illumination apparatus discussed in Japanese Patent Application Laid-Open No. 2001-215574 uses, as light sources, glass tubes which are generally manufactured as a straight tube type such as a xenon tube, by processing the glass tubes into an arc shape (bent tube type) through high-accuracy bending processing. As a result, there arises a problem that the cost of light sources increases and accordingly the illumination apparatus becomes expensive. Further, sufficient performance cannot be achieved in terms of the light usage efficiency and light distribution because it is difficult to efficiently and uniformly irradiate a subject (target of macro photographing) with light emitted from such a plurality of bent tube type light sources. Furthermore, this type of illumination apparatus is required to be as small as possible since it is carried and used together with a camera (and exchangeable imaging lenses).

SUMMARY OF THE INVENTION

The present invention is directed to efficiently using light from a light source and preventing an illumination apparatus from increasing in size.

According to an aspect of the present invention, an illumination apparatus includes a light source, a light-receiving unit, and a light guide having an arc shape. The light guide includes a light incidence section, a first reflecting section, a second reflecting section, and a light-emitting section for emitting light reflected by the first reflecting section. The light incidence section is disposed on an outer circumferential side of the light guide unit and faces the light source. The first reflecting section has a first arc-shaped region and a second arc-shaped region disposed at a position further from the light source than the light incidence section in a circumferential direction of the arc of the light guide unit. The first region is disposed closer to one end of the arc of the light guide unit than the light incidence section, and the second region is disposed closer to another end of the arc of the light guide unit than the light incidence section. The second reflecting section includes a first surface for reflecting the light incident from the light incidence section toward the first region, and a second surface for reflecting the light incident from the light incidence section toward the second region. The light-receiving unit is disposed at a position between the first and the second surfaces.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
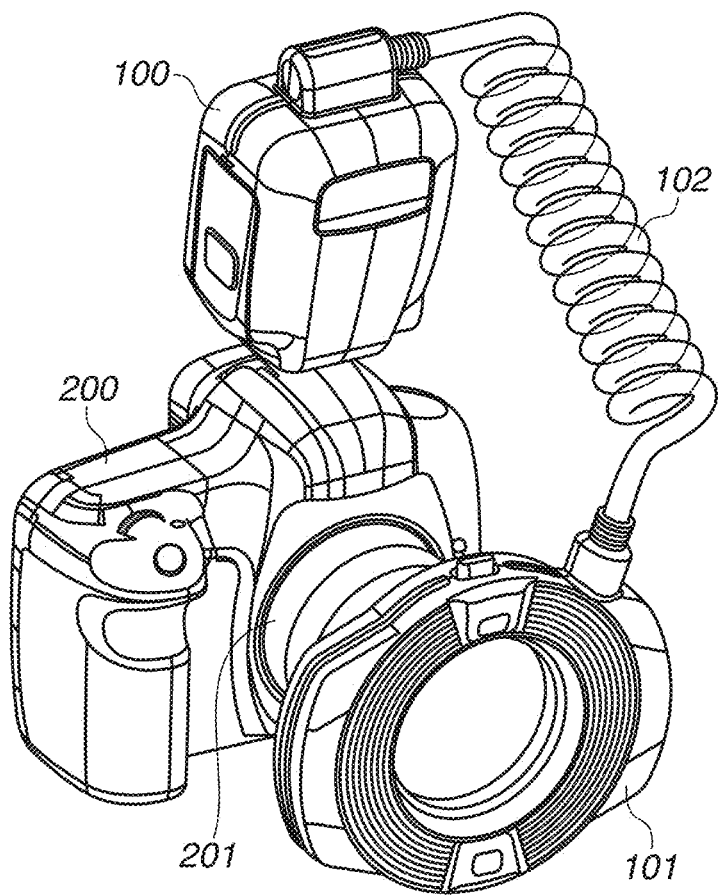
FIG. 1 is a perspective view illustrating an overall configuration in a state where an illumination apparatus according to an exemplary embodiment of the present invention is attached to an imaging apparatus.

FIG. 1 illustrates a camera system including a strobe apparatus as an illumination apparatus, a camera 200 as an imaging apparatus, and an imaging lens 201 according to an exemplary embodiment of the present invention. The strobe apparatus is composed of a control unit 100 and a flash unit 101 which are connected by a connection cord 102. As illustrated in FIG. 1, the control unit 100 is detachably attached to an accessory shoe of the camera 200, and the flash unit 101 is detachably attached to the imaging lens 201 so as to surround the circumference of the imaging lens 201. The imaging lens 201 may be provided integrally with the camera 200, or may be an exchangeable lens detachably attached to the camera 200. The flash unit 101 may be detachably attached to the camera 200 instead of the imaging lens 201, as long as the flash unit 101 can be attached so as to surround the circumference of the imaging lens 201.

Figure 2:
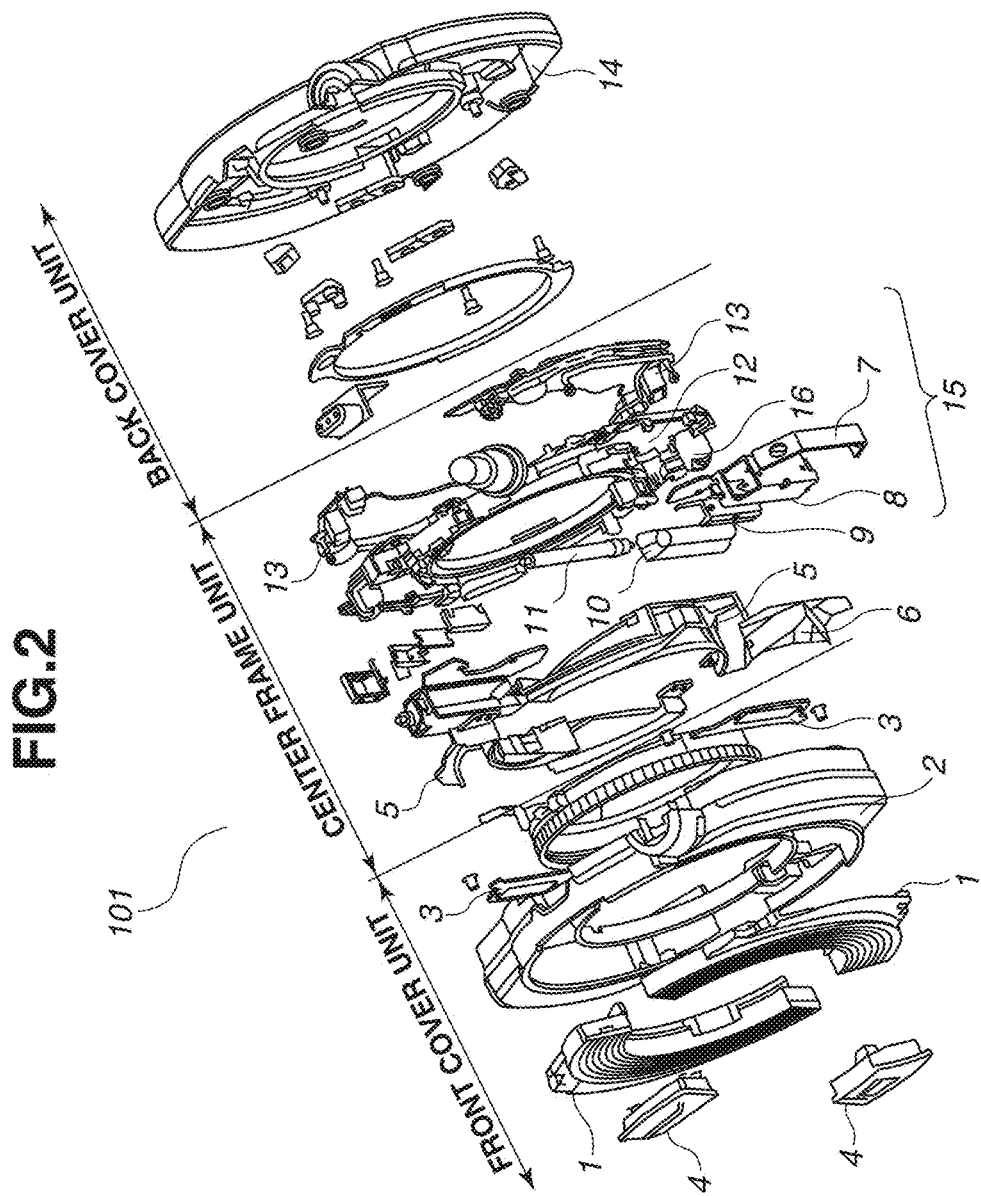
FIG. 2 is an exploded perspective view illustrating a strobe apparatus according to the exemplary embodiment of the present invention.

FIG. 2 is an exploded perspective view illustrating the flash unit 101 of the strobe apparatus according to the exemplary embodiment of the present invention. The flash unit 101 includes a front cover unit, a center frame unit, and a back cover unit. The front cover unit includes prism panels 1, a front cover 2, thermal diffusion plates 3, and focusing units 4. The center frame unit includes light-emitting optical systems, a center frame 12, substrates 13, light emission units 15, and sensor units 16. The back cover unit includes a lock mechanism and a back cover 14.

Figure 3:
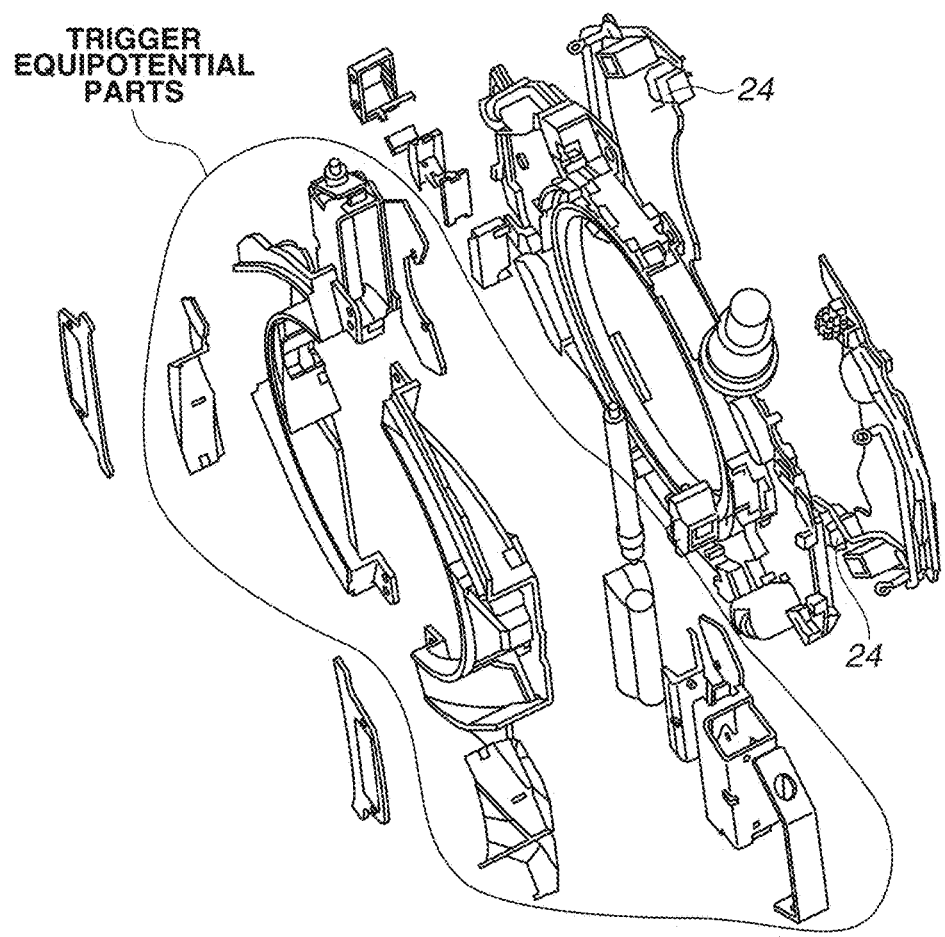
FIG. 3 is an exploded perspective view illustrating a center frame unit of a flash unit.

FIG. 3 is an exploded perspective view illustrating the center frame unit. In the center frame unit, the parts of each light-emitting optical system, to which a trigger voltage from each trigger coil 24 is applied, are disposed on the subject side (front side) of the center frame 12. To control the amount of light emission of each light emission unit 15, each sensor unit 16 for monitoring light from the light emission unit 15 is also disposed on the subject side, similar to the light-emitting optical system. However, a sensor cover 17 for diffusing the light from the light emission unit 15 is made of a nonconductive member formed by molding. Therefore, since the sensor cover 17 has a function of insulating the parts in the sensor cover 17 from the trigger voltage, the trigger voltage is not applied to the parts in the sensor cover 17.

Each substrate 13 having electronic members mounted thereon is disposed on the user side (back side) across the center frame 12. When the light emission unit 15 emits light, the trigger voltage is applied not only to the light source of the light emission unit 15 but also to the parts of the light-emitting optical system. Accordingly, a phenomenon called trigger sputtering may occur, in which the trigger voltage is applied to other metal parts and substrates. However, since the center frame 12 is a nonconductive member formed by molding, the trigger voltage does not sputter to the substrate 13 disposed closer to the user side than the center frame 12. By disposing nonconductive members between the light-emitting optical system to which a high voltage is applied at the time of light emission, and the substrate 13, the substrate 13 can be protected from electrical noise occurring at the time of light emission. Further, by sheathing the parts in the sensor unit 16 for detecting the light from the light emission unit 15, with the sensor cover 17 (nonconductive member) to control the amount of light emission of the light emission unit 15, the parts can be protected in the sensor unit 16 from electrical noise occurring at the time of light emission.

Figure 4A:
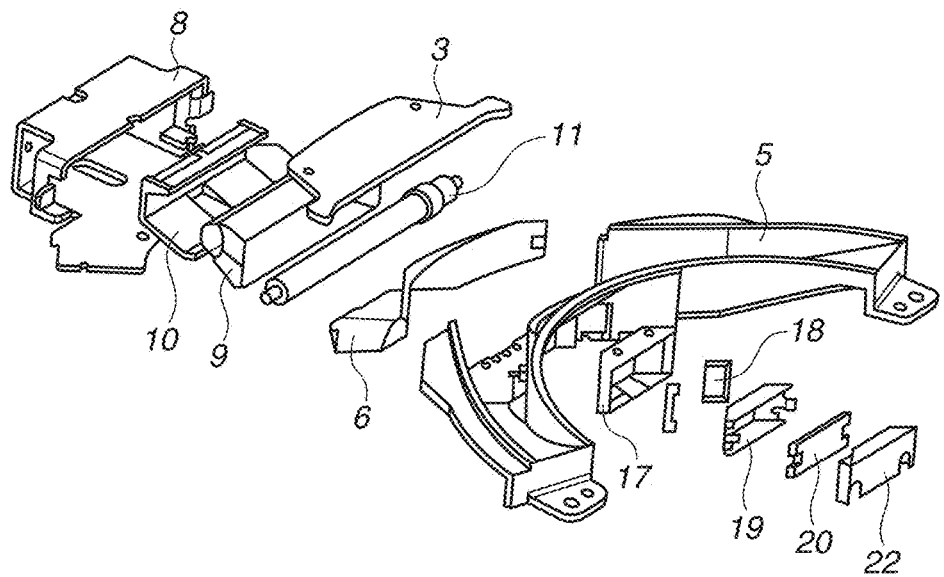
FIGS. 4A and 4B are perspective views illustrating a light-emitting optical system, a light emission unit, and a sensor unit of the flash unit.
Figure 4B:
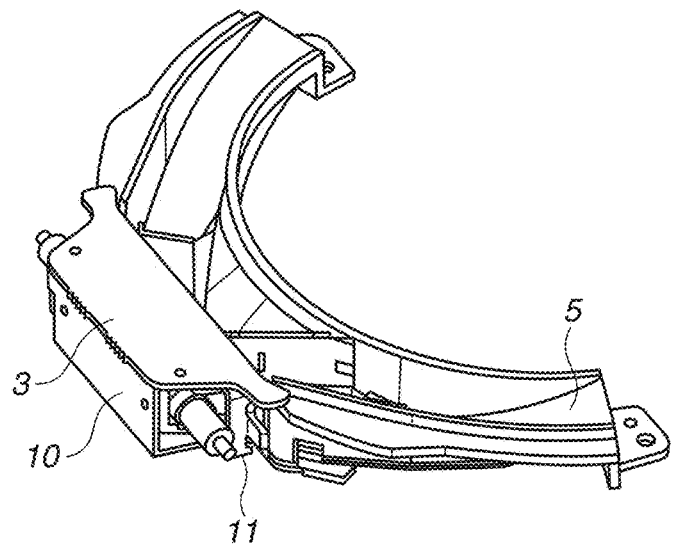
Figure 6A:
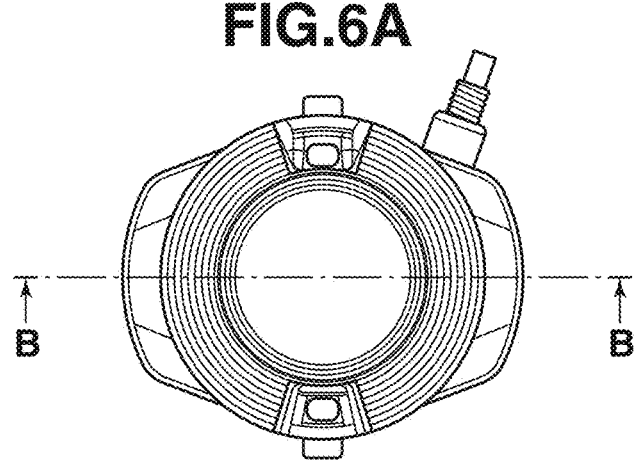
FIGS. 6A, 6B, and 6C are detail views illustrating an internal configuration of the flash unit.
Figure 6B:
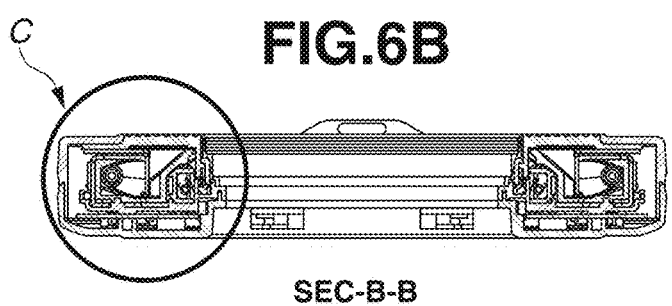
Figure 6C:
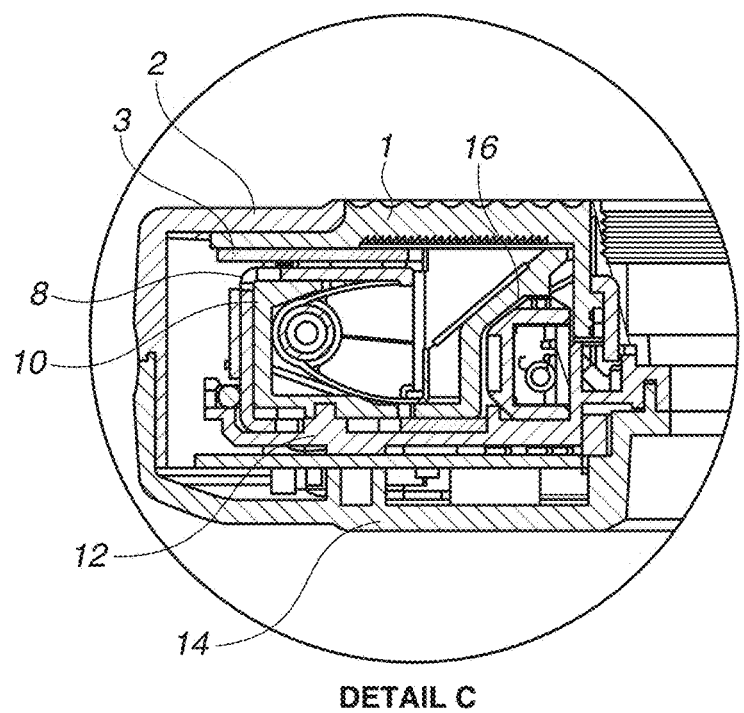
Figure 7A:
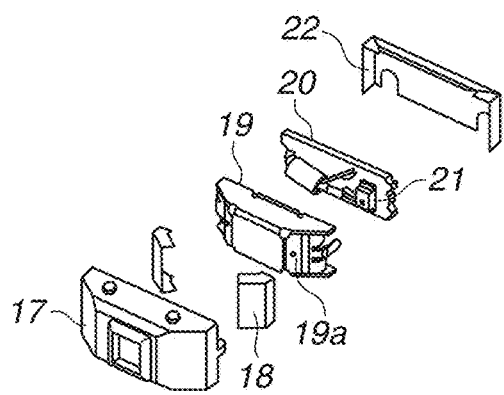
FIGS. 7A, 7B, and 7C are detail views illustrating the sensor unit.
Figure 7B:
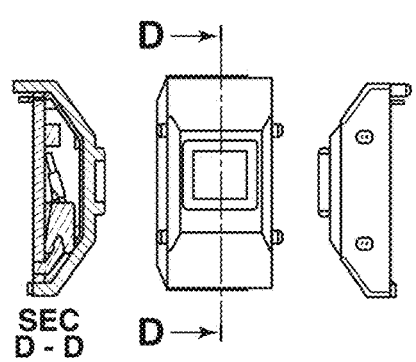
Figure 7C:
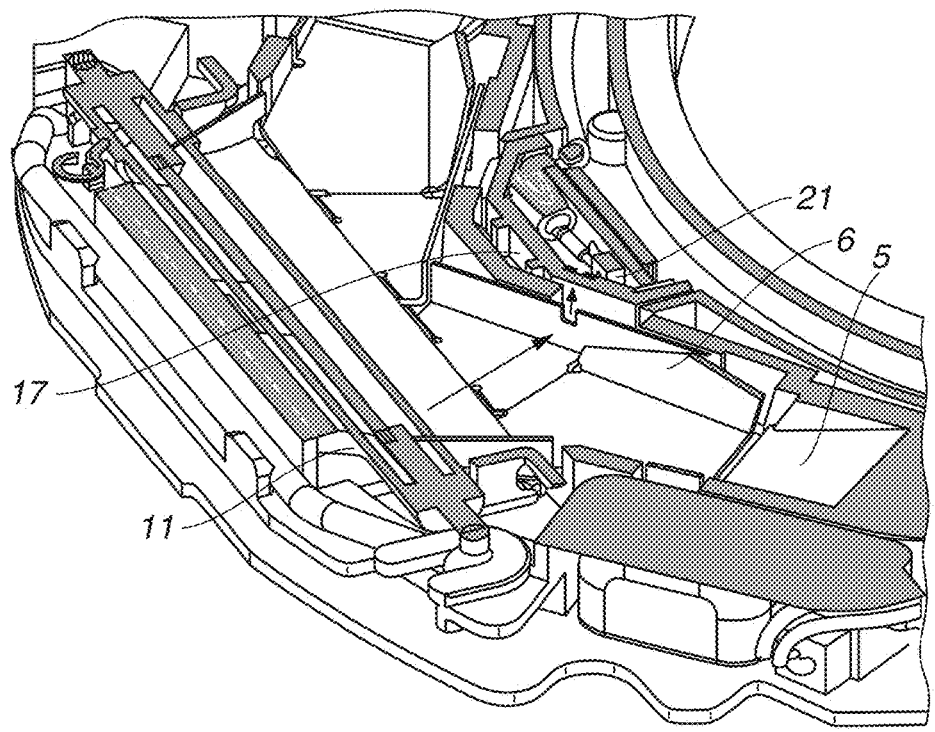

The light-emitting optical system, the light emission unit 15, and the sensor unit 16 of the flash unit 101 will be described below with reference to FIGS. 4A and 4B, 5A to 5D, 6A to 6C, and 7A to 7C. FIGS. 4A and 4B illustrate the light-emitting optical system, the light emission unit 15, and the sensor unit 16. FIGS. 5A to 5D illustrate a configuration of the light-emitting optical system. FIGS. 6A to 6C are detail views illustrating an internal configuration of the flash unit 101. FIGS. 7A to 7C are detail views illustrating the sensor unit 16. Although the flash unit 101 includes a pair of the light-emitting optical systems, a pair of the light emission units 15, and a pair of the sensor units 16, only one unit of each pair will be described below.

The light emission unit 15 includes a Xe tube 11, a reflective umbrella 9, a reflective umbrella holder 10, a heat sink 8, and a silicon band 7. Although, as described above, the thermal diffusion plate 3 is included in the front cover unit, the thermal diffusion plate 3 will be described below since it is related with the light emission unit 15.

The Xe (xenon) tube 11 is a light source of the flash unit 101, to which the trigger voltage from the trigger coil 24 is applied. The trigger coil 24 is mounted on the substrate 13, and is electrically connected to the reflective umbrella 9 via a cable. The trigger voltage is applied from the trigger coil 24 to the Xe tube 11 via the reflective umbrella 9. The Xe tube 11 is a linear tube of which the longitudinal direction coincides with a tangential projection relative to the circumferential direction of an arc-shaped reflecting member 5 (described below). The Xe tube 11 is disposed on an outward side of the arc-shaped reflecting member 5 in the radial direction of the arc-shaped reflecting member 5. The reflective umbrella 9 covers the Xe tube 11 in such a way that a part of an opening is disposed in the direction perpendicular to the longitudinal direction of the Xe tube 11. The reflective umbrella 9 reflects light emitted from the Xe tube 11 toward the light-emitting optical system. The reflective umbrella holder 10 holds the reflective umbrella 9. The heat sink 8, made of a metal material such as copper and aluminum having high thermal conductivity, covers the reflective umbrella 9 and the reflective umbrella holder 10 to diffuse heat of the reflective umbrella 9 and the reflective umbrella holder 10 to which heat radiated from the Xe tube 11 is transmitted. Further, the heat sink 8 includes a first thermal diffusion portion closer to the light-emitting section than the Xe tube 11, and a second thermal diffusion portion further from the light-emitting section than the Xe tube 11. The second thermal diffusion portion has a larger area than the first thermal diffusion portion. More specifically, the heat sink 8 has a larger area on the user side than on the subject side. The surface on the user side is in contact with the center frame 12 to transfer heat from the reflective umbrella 9 and the reflective umbrella holder 10 to the center frame 12. The silicon band 7 is an elastic member which secures the Xe tube 11, the reflective umbrella 9, the reflective umbrella holder 10, and the heat sink 8.

The thermal diffusion plate 3 is in contact with the surface of the heat sink 8 on the subject side, sandwiched between the heat sink 8 and the prism panel 1, and fixed to the prism panel 1 by a double-sided adhesive tape. The heat of the heat sink 8 does not directly transfer to the prism panel 1. Instead, the heat is once conducted to the thermal diffusion plate 3 via an air layer to be diffused, and then the diffused heat transfers to the prism panel 1 without making hot spots.

The light-emitting optical system includes the arc-shaped reflecting member 5 made of metal-deposited resin, and a reflecting plate 6 made of a metal material such as bright aluminum. The light-emitting optical system guides the light from the light emission unit 15 in an arc form, and radiates the light to the subject side. Since the Xe tube 11 is close to the arc-shaped reflecting member 5, and the focal position of the reflective umbrella 9 overlaps with the arc-shaped reflecting member 5, the arc-shaped reflecting member 5 receives a large thermal energy radiated from the Xe tube 11. Therefore, by disposing the reflecting plate 6 at a position where a large thermal energy is received from the Xe tube 11, the arc-shaped reflecting member 5 can be protected. Although, in the present exemplary embodiment, the arc-shaped reflecting member 5 and the reflecting plate 6 are fitted as separate members, the arc-shaped reflecting member 5 and the reflecting plate 6 may be integrally formed through in-mold molding when forming the arc-shaped reflecting member 5.

To guide the light from the linear Xe tube 11 (light source) in an arc form and radiate the light to the subject side, it is necessary to increase the amount of light emission of the Xe tube 11. Accordingly, neighboring parts are largely affected by heat generated by the Xe tube 11. However, even in the above-described configuration using the linear Xe tube 11 as a light source, sufficient light distribution and guide number can be obtained, because the heat generated by the Xe tube 11 is efficiently diffused by using the heat sink 8 and the thermal diffusion plate 3, and neighboring parts are protected by the reflecting plate 6.

Figure 5A:
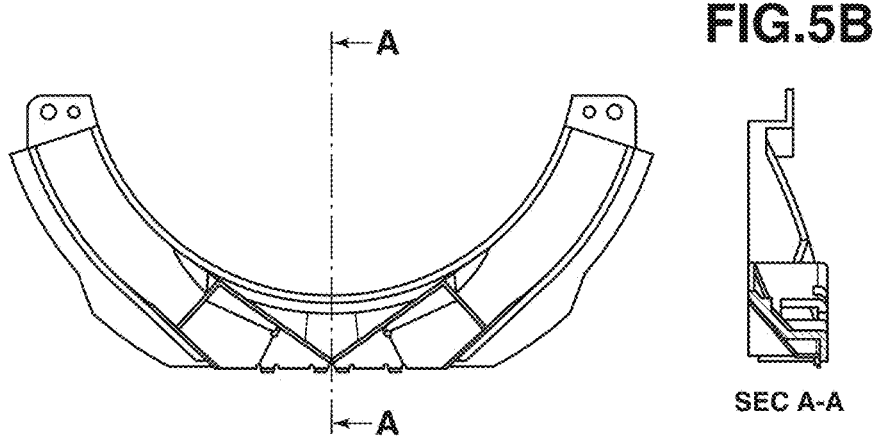
FIGS. 5A to 5D illustrate a configuration of the light-emitting optical system of the flash unit.
Figure 5B:
Figure 5C:
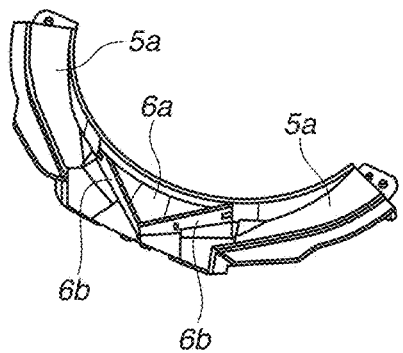
Figure 5D:
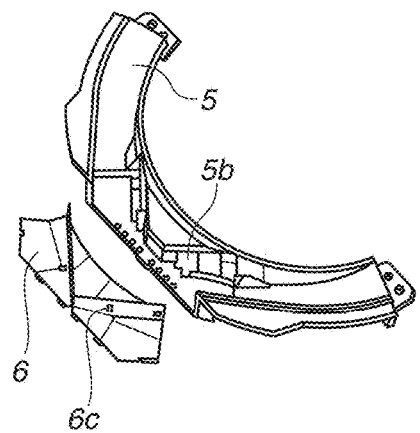

Further, in order to cause the light-emitting optical system to function as a light guide unit for guiding the light from the light emission unit 15 in an arc form and radiating the light to the subject side, the arc-shaped reflecting member 5 is provided with reflection surfaces 5a, and the reflecting plate 6 is provided with reflection surfaces 6a and 6b, as illustrated in FIG. 5C. In other words, the light-emitting optical system serves as a light guide unit. Each of the reflection surfaces 5a is an arc-shaped surface for reflecting the received light to the prism panel 1 side (subject side). The reflection surfaces 5a include a region extending in one circumferential direction and a region extending in another circumferential direction, from a region facing the light source. The regions are inclined in such a way that, the further they depart from the light emission unit 15 in a circumferential direction, the closer they come to the prism panel 1. The reflection surface 6a is a substantially triangular surface extending in the radial direction of the arc-shaped reflecting member 5. The reflection surface 6a faces the Xe tube 11, and reflects the received light to the prism panel 1 side (subject side). Each of the reflection surfaces 6b is a surface for reflecting the received light toward each of the reflection surfaces 5a. The reflection surfaces 6b are disposed substantially perpendicularly to a plane parallel in the radial direction of the arc-shaped reflecting member 5. The two reflection surfaces 6b having different reflective directions include a surface for reflecting a part of the light from the light source toward the region extending to one side of the arc-shaped reflecting member 5, and a surface for reflecting another part of the light from the light source toward the region extending to another side of the arc-shaped reflecting member 5. The reflection surfaces 6b are disposed so that they become closer to each other as they go further to the outer circumferential side in the radial direction of the circular arc of the arc-shaped reflecting member 5. The reflection surface 6a is disposed closer to the prism panel 1 side (subject side) than the two reflection surfaces 6b. Two edges of the reflection surface 6a sandwiching a corner oriented toward the light emission unit 15 are respectively connected with the two reflection surfaces 6b. The above-described configuration can be summarized as described below. An opening disposed on the outer circumferential side of the arc-shaped reflecting member 5 is a light incidence section on which the light from the Xe tube 11 is incident. The light incidence section faces the Xe tube 11. The reflection surfaces 5a are first reflecting sections and include a first region and a second region each having an arc shape disposed at a position further from the light source than the light incidence section in the circumferential direction of the circular arc of the light guide unit. The first region is disposed closer to one end of the circular arc of the light guide unit than the light incidence section, and the second region is disposed closer to another end of the circular arc of the light guide unit than the light incidence section. The reflection surfaces 6b are second reflecting sections and include a first surface and a second surface. The first surface reflects the light incident from the light incidence section in a direction of the first region, and a second surface reflects the light incident from the light incidence section in a direction of the second region. An opening formed by an inner circumferential side wall and an outer circumferential side wall of the arc-shaped reflecting member 5 is a light-emitting section for emitting the light reflected by the reflection surfaces 5a. The reflection surface 6a is a third reflecting section and is disposed between the first and the second surfaces, at a position closer to the light-emitting section than the first and the second surfaces. The reflection surface 6a reflects the light incident from the light incidence section in a direction of the light-emitting section.

As described above, by providing a light guide unit having a reflecting section for reflecting the light from the linear light source to the subject side and reflecting sections for guiding the light in an arc form, sufficient light distribution and guide number can be acquired even in a configuration where the linear Xe tube 11 is used as a light source.

In the above-described configuration, a space surrounded by the back side of the reflection surface 6a and the back sides of the two reflection surfaces 6b is formed. In the present exemplary embodiment, the sensor unit 16 as a light-receiving unit is disposed in this space. More specifically, the sensor unit 16 is disposed at a position between the two reflection surfaces 6b, and the reflection surface 6a is disposed at a position closer to the prism panel 1 than the sensor unit 16.

The sensor unit 16 includes the sensor cover 17, a shield tape 18, a sensor shield 19, a sensor substrate 20, a sensor 21, and a light-shielding tape 22, and functions as a light-receiving section.

The sensor cover 17 is made of a white resin material, and has a role of protecting the parts in the sensor unit 16 from electrical noise occurring at the time of light emission, as described above. The shield tape 18 is used to shield a bent relief shape of the sensor shield 19 which is a metal press part. The sensor substrate 20 is a substrate on which the sensor 21 is mounted. The sensor 21 monitors (detects) the light from the light emission unit 15 to control the amount of light emission of the light emission unit 15. The light-shielding tape 22 is used to prevent light from entering the sensor 21 from the back side of the sensor substrate 20.

FIG. 7C illustrates a light path at the time when the sensor 21 monitors the light from the light emission unit 15.

The light from the light emission unit 15 passes through a hole portion 6c disposed on the reflection surface 6b and through a hole portion 5b disposed at a position of the arc-shaped reflecting member 5 where the hole portion 5b overlaps with the hole portion 6c of the reflection surface 6b. Then, the light reaches the sensor cover 17. The hole portions 6c and 5b are disposed at positions deviated from a straight line connecting the center of the Xe tube 11 and the sensor 21. The light that has reached the sensor cover 17 is diffused by the sensor cover 17 showing a diffusion effect. The diffused light passes through a hole portion 19a disposed on the sensor shield 19, and is received by the sensor 21. In the present exemplary embodiment, the sensor 21 is disposed at a position deviated from a plane passing through the longitudinal center of the Xe tube 11 and perpendicularly intersecting with the relevant longitudinal direction. Therefore, a hole portion of each part is disposed on the side where the sensor 21 is disposed (in the same direction as the sensor 21) so that the light may easily reach the sensor 21. More specifically, the sensor 21 is disposed at a position deviated toward the first or the second surface from a straight line connecting the center of the Xe tube and the boundary between the first and the second surfaces. The hole portions 6c and 5b are disposed on either the first or the second surface to which the sensor 21 is deviated.

However, if the sensor 21 is disposed at a portion overlapping with the plane passing through the longitudinal center of the Xe tube 11 and perpendicularly intersecting with the relevant longitudinal direction, a hole portion of each part may be symmetrically disposed centering on the plane passing through the longitudinal center of the Xe tube 11 and perpendicularly intersecting with the relevant longitudinal direction. In the configuration in which the sensor 21 is disposed in the space surrounded by the back side of the reflection surface 6a and the back sides of the two reflection surfaces 6b, if a hole portion of each part is disposed at a portion overlapping with the plane passing through the longitudinal center of the Xe tube 11 and perpendicularly intersecting with the relevant longitudinal direction, the sensor 21 receives an excessive light amount. Therefore, it is desirable not to dispose holes of the parts at a portion overlapping with the plane passing through the longitudinal center of the Xe tube 11 and perpendicularly intersecting with the relevant longitudinal direction.

As described above, the light guide unit guides the light from the linear light source in an arc form and radiates the light to the subject side, efficiently using the light from the linear light source without using bent tube type light sources. Further, by disposing the sensor for monitoring the light from the light source in a space formed by the light guide unit, an illumination apparatus can be prevented from increasing in size.

Figure 8A:
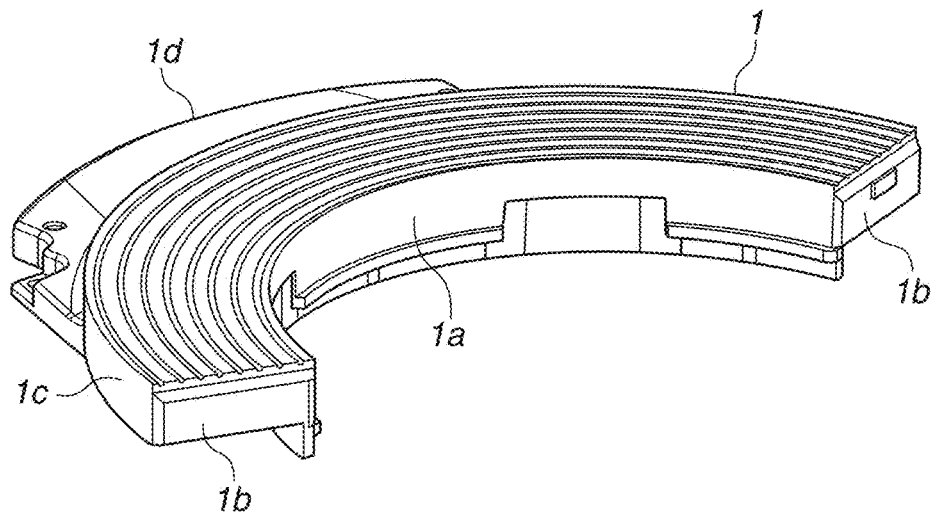
FIGS. 8A and 8B are general views illustrating a prism panel.
Figure 8B:
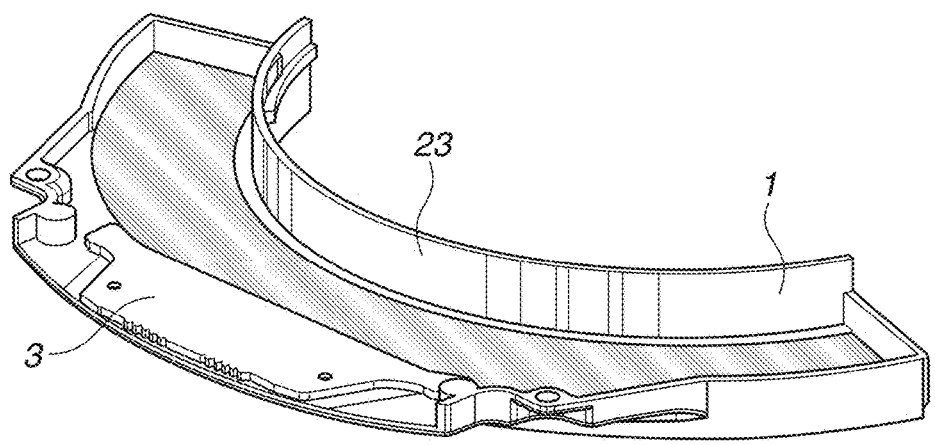
Figure 9A:
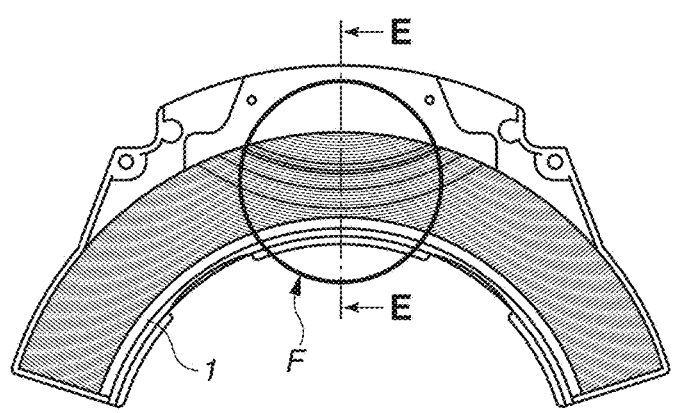
FIG. 9A to 9D are detail views illustrating the prism panel.
Figure 9B:
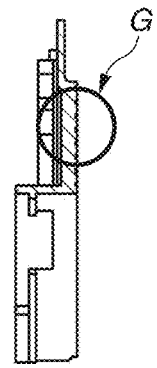
Figure 9C:
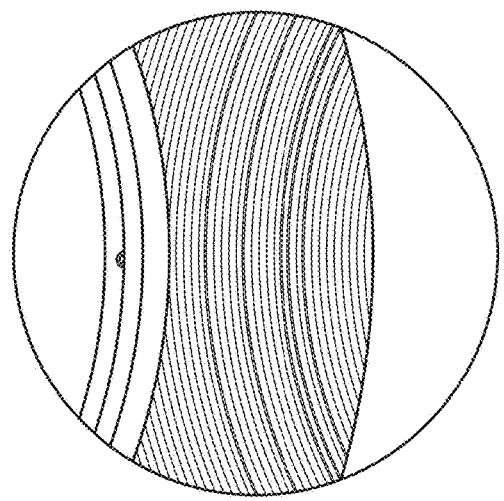
Figure 9D:
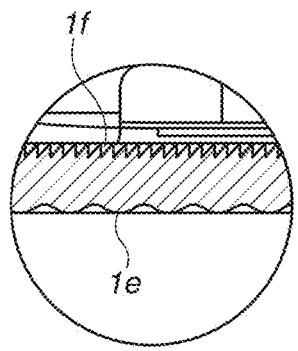
Figure 10:
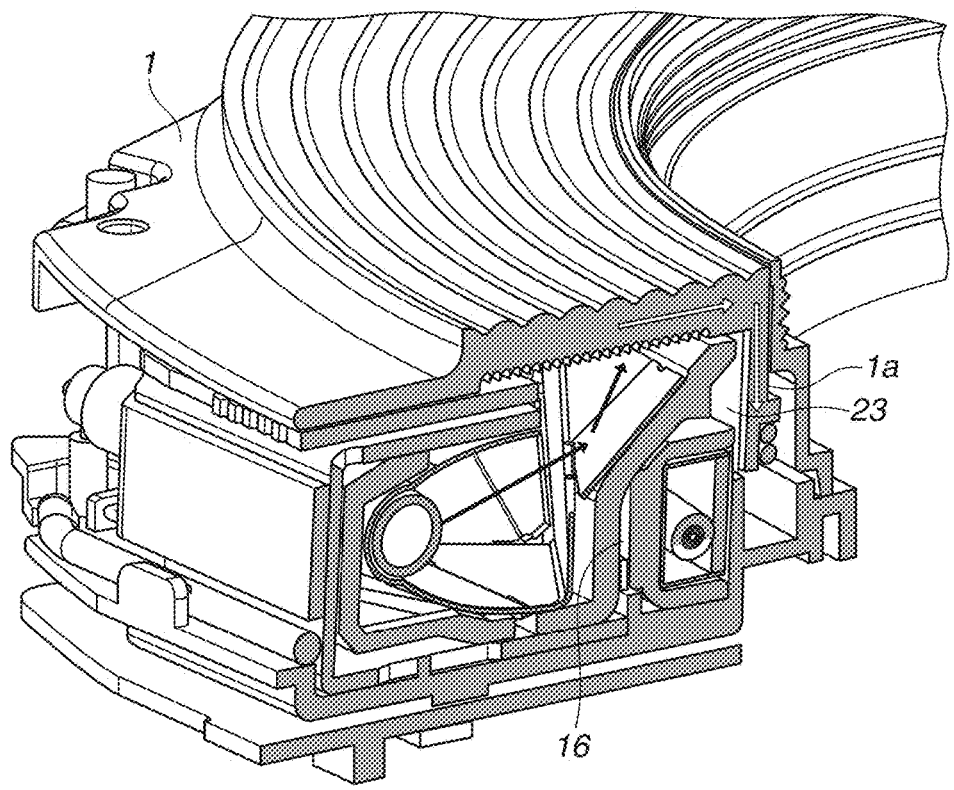
FIG. 10 illustrates an internal light path of the prism panel.

The prism panel 1 as an optical panel will be described below with reference to FIGS. 8A and 8B, 9A to 9D, and 10. FIGS. 8A and 8B illustrate an overall configuration of the prism panel 1. FIG. 8A illustrates the front side (light-emitting side) of the prism panel 1. FIG. 8B illustrates the back side (incidence side) of the prism panel 1. FIGS. 9A to 9D are detail views illustrating the prism panel 1. FIG. 10 illustrates the internal light path through the prism panel 1. Two prism panels 1 are provided in the flash unit 101 corresponding to the light-emitting optical systems to form a substantially ring shape. The two prism panels 1 have a similar configuration, therefore, only one prism panel 1 will be described below.

The prism panel 1 has an arc shape to fit into the circular arc of the arc-shaped reflecting member 5, and is disposed on the front side (subject side) of the arc-shaped reflecting member 5, i.e., the front face of the light-emitting section of the arc-shaped reflecting member 5. The prism panel 1 is made of a transparent resin material having high transmissivity, such as an acrylic resin, or a creamy-white material containing a transparent resin mixed with a diffusion material.

On the exit surface of the prism panel 1, a plurality of cylindrical lenses 1e is concentrically formed along the arc shape of the prism panel 1. A cylindrical lens 1e refracts and diffuses the light that passes through the inside of the prism panel 1 and reaches the exit surface.

On the incidence plane of the prism panel 1, a plurality of minute prism portions 1f is concentrically formed centering on the longitudinal center position of the Xe tube 11 in a state where the front cover unit, the center frame unit, and the back cover unit are assembled. As described above, the prism panel 1 functions as a light-emitting section for emitting the light reflected by the arc-shaped reflecting member 5.

The above-described configuration can be summarized as described below. On the exit surface of the prism panel 1, a plurality of cylindrical lenses 1e is concentrically formed centering on the first position. On the incidence plane of the prism panel 1, a plurality of prism portions 1f is concentrically formed centering on the second position. The first position is a position further on the inner circumferential side of the light guide unit than the light-emitting section. The second position is a position further on the outer circumferential side of the light guide unit than the light-emitting section.

The prism panel 1 is provided with ribs 1a, 1b, 1c, and 1d on the outer edges. These ribs have a role of providing and lengthening creepage distance so that static electricity from the outside of the flash unit 101 does not sputter to conductive members, such as the light-emitting optical system, inside the flash unit 101.

The ribs 1a, 1b, and 1c extend from the exit surface side (front side) to the optical incidence plane side (back side) in the direction perpendicular to the incidence plane and the exit surface. The rib 1a is disposed at the inner circumferential end of the arc shape. The ribs 1b are disposed at the circumferential ends of the arc shape. The rib 1c is disposed at the outer circumferential end of the arc shape. In a state where the front cover unit, the center frame unit, and the back cover unit are assembled, the rib 1d overlaps with the heat sink 8 and extends in a radial direction of the arc shape so as to be more outwardly protruded than the heat sink 8. As described above, the thermal diffusion plate 3 is sandwiched between the rib 1d and the heat sink 8 so that heat of the heat sink 8 is not directly transferred to the prism panel 1.

Since the ribs 1a, 1b, 1c, and 1d are disposed on the outer edges of the prism panel 1 to provide and lengthen creepage distance, a part of incident light to the prism panel 1 may possibly pass through the rib 1a and reach the sensor 21 because the rib 1a extends to the vicinity of the sensor 21. If the sensor 21 receives such light, it cannot correctly detect the amount of light emission of the Xe tube 11. Therefore, a light-shielding tape 23 is stuck at a position on the rib 1a in the vicinity of the sensor 21.

As illustrated by an arrow in FIG. 10, a part of the light from the Xe tube 11 is reflected by the light-emitting optical system and is incident on the prism panel 1. The light advances to the rib 1a being totally reflected inside the prism panel 1 without being emitted from the exit surface. After that, if the light-shielding tape 23 is not stuck, the light inside the prism panel 1 may possibly be emitted from the rib 1a and reach the sensor 21. However, sticking the light-shielding tape 23 enables preventing the light from reaching the sensor 21.

Although the illumination apparatus according to the present exemplary embodiment has two different light sources as described above, the present exemplary embodiment is also applicable to an illumination apparatus having one light source or an illumination apparatus having three or more light sources.

Although the illumination apparatus according to the present exemplary embodiment connects a control unit to the flash unit with the connection cord, the exemplary embodiment is also applicable to an illumination apparatus having a control unit and a flash unit integrally formed.

Further, as long as an illumination apparatus has light sources for emitting light by using energy accumulated in a main capacitor, light sources other than xenon tubes may be used. For example, instead of a linear Xe tube, a plurality of linearly arranged point light sources, such as light emitting diodes (LEDs), may be used.

While the present invention has specifically been described based on the above-described preferred exemplary embodiment, the present invention is not limited thereto but can be modified in diverse ways within the ambit of the appended claims.

According to the present invention, it is possible to efficiently use light from a light source and prevent an illumination apparatus from increasing in size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-023827 filed Feb. 10, 2014, which is hereby incorporated by reference herein in its entirety.

What is claimed is:
1. An illumination apparatus comprising:
a light source;
a light-receiving unit; and
a light guide unit having an arc shape,
wherein the light guide unit comprises:
a light incidence section on which light from the light source is incident, wherein the light incidence section is disposed on an outer circumferential side of the light guide unit and faces the light source;

a first reflecting section having a first arc-shaped region and a second arc-shaped region, wherein both the first arc-shaped region and the second arc-shaped region are disposed at a position further from the light source than the light incidence section in a circumferential direction of the arc shape of the light guide unit, wherein the first arc-shaped region is disposed closer to one end of the arc shape of the light guide unit than the light incidence section, and wherein the second arc-shaped region is disposed closer to another end of the arc shape of the light guide unit than the light incidence section;

a second reflecting section having a first surface for reflecting the light incident from the light incidence section toward the first arc-shaped region, and a second surface for reflecting the light incident from the light incidence section toward the second arc-shaped region;

a third reflecting section, which is disposed at a position between the first and the second surfaces, for reflecting the light incident from the light incidence section; and a light-emitting section configured to emit the light reflected by the first reflecting section and the third reflecting section, wherein the third reflecting section is disposed at a position closer to the light-emitting section than the first and the second surfaces, wherein the light-receiving unit is disposed at a position surrounded by the first and the second surfaces and the third reflecting section, and wherein a hole portion is disposed on at least one of the first and the second surfaces.

2. The illumination apparatus according to claim 1, wherein the hole portion is disposed at a position deviated from a straight line connecting a center of the light source and a sensor of the light-receiving unit.

3. The illumination apparatus according to claim 2, wherein the first and the second surfaces are adjacently disposed, and wherein the sensor of the light-receiving unit is disposed at a position deviated from a straight line connecting the center of the light source and a boundary between the first and the second surfaces, toward the first or the second surface, and wherein the hole portion is disposed on either the first or the second surface toward which the sensor is deviated.

4. The illumination apparatus according to claim 1, wherein the light-receiving unit has a cover showing a diffusion effect for diffusing light that passes the hole portion.

5. The illumination apparatus according to claim 4, wherein the cover is a nonconductive member.

6. The illumination apparatus according to claim 1, wherein the light source has an arc shape.

7. The illumination apparatus according to claim 1, wherein the light source is a linear light source or a plurality of linearly arranged light sources of which the longitudinal direction coincides with a tangential projection relative to the circumferential direction.

8. The illumination apparatus according to claim 1, wherein the light-receiving unit detects light from the light source to control a light emission amount of the light source.

9. The illumination apparatus according to claim 1, wherein the illumination apparatus is attached to an imaging apparatus so as to surround a circumference of an imaging lens of the imaging apparatus.

10. The illumination apparatus according to claim 1, further comprising:

a heat sink configured to diffuse heat radiated from the light source.

11. The illumination apparatus according to claim 10, wherein the heat sink includes a first thermal diffusion portion closer to the light-emitting section than the light source, and a second thermal diffusion portion further from the light-emitting section than the light source, and wherein the second thermal diffusion portion has a larger area than the first thermal diffusion portion.

12. The illumination apparatus according to claim 1, further comprising:

an optical panel disposed on a front face of the light-emitting section.

13. The illumination apparatus according to claim 12, further comprising:

a thermal diffusion plate overlapping with a portion of the optical panel extending further to an outer circumferential side of the light guide unit than the light-emitting section.

14. The illumination apparatus according to claim 12, further comprising:

a light-shielding tape attached to an inner circumferential side end of the light guide unit of the optical panel.

15. The illumination apparatus according to claim 14, wherein the inner circumferential side end of the light guide unit extends to a vicinity of the light-receiving unit.

16. The illumination apparatus according to claim 12, wherein a plurality of cylindrical lenses is concentrically formed on an exit surface of the optical panel.

17. The illumination apparatus according to claim 12, wherein a plurality of prism portions is concentrically formed on an incidence plane of the optical panel.

18. The illumination apparatus according to claim 12, wherein, on an exit surface of the optical panel, a plurality of cylindrical lenses is concentrically formed centering on a first position, and, on an incidence plane of the optical panel, a plurality of prism portions is concentrically formed centering on a second position, wherein the first position is a position further on an inner circumferential side of the light guide unit than the light-emitting section, and wherein the second position is a position further on the outer circumferential side of the light guide unit than the light-emitting section.

* * * * *